No. 886,873. PATENTED MAY 5, 1908.
C. H. SCHMIDT.
TRACTION WHEEL FOR MOTOR VEHICLES.
APPLICATION FILED JUNE 4, 1907.
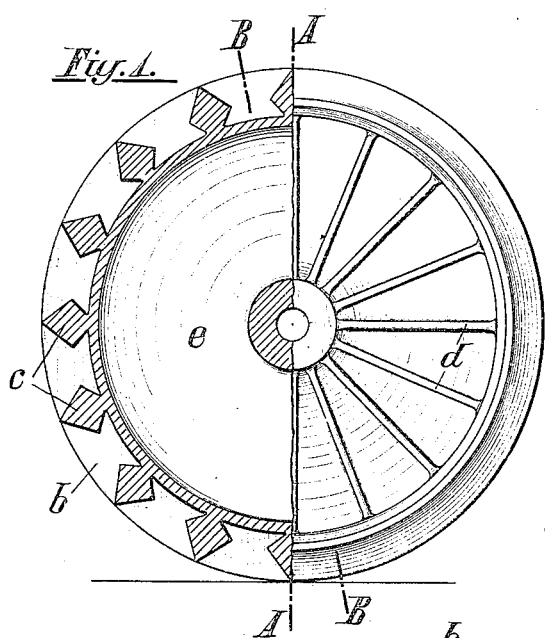
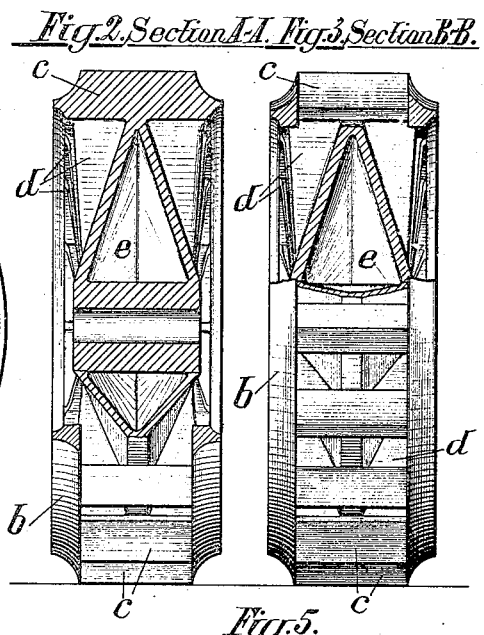
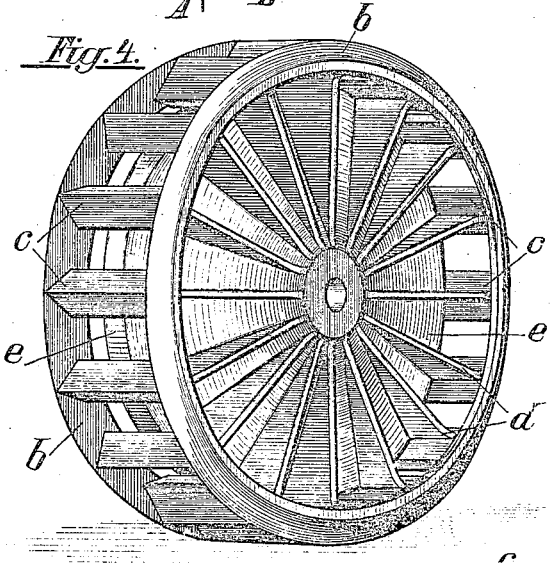
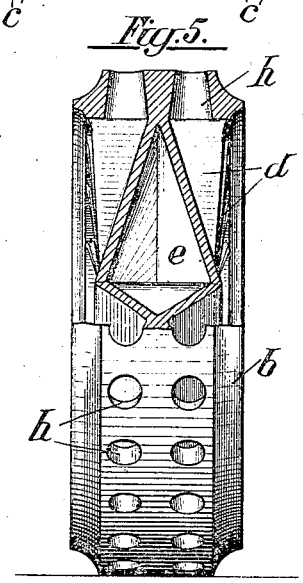
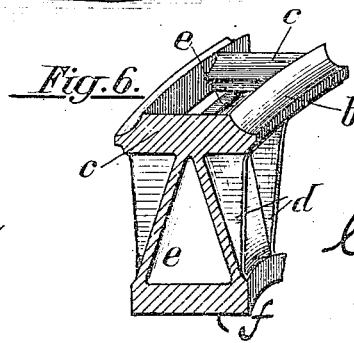
Witnesses:
Inventor:
Carl H. Schmidt,

UNITED STATES PATENT OFFICE.

CARL H. SCHMIDT, OF UNTERTÜRKHEIM-STUTTGART, GERMANY, ASSIGNOR TO EDUARD SCHARRER, OF CANNSTATT, GERMANY.

TRACTION-WHEEL FOR MOTOR-VEHICLES.

No. 886,873.   Specification of Letters Patent.   Patented May 5, 1908.

Application filed June 4, 1907. Serial No. 377,129.

*To all whom it may concern:*

Be it known that I, CARL H. SCHMIDT, a citizen of the German Empire, residing at Untertürkheim-Stuttgart, in the Kingdom of Würtemberg, Empire of Germany, have invented certain new and useful Improvements in Traction-Wheels for Motor-Vehicles, of which the following is a description, reference being had to the accompanying drawing and to the letters and figures of reference marked thereon.

Although the motor car-industry has made great progress everywhere, yet these vehicles are only employed to a small extent for agricultural purposes. Especially up to the present such cars could not be employed for instance for motor-plows, which are used frequently with twelve shares, as a suitable substitute for draft-cattle, although it would not offer any difficulty to the high standing of the present motor-manufacture to construct motors of such a power that the agricultural implements could be moved in the manner of motor-cars with sufficient speed through the field. The reason for this is, that up to the present there do not exist any wheels which are fitted for use upon the loose and often sandy soil. For overcoming this difficulty, there are provided according to the present invention peculiarly constructed wheels fitted for the transport of motor-plows and other agricultural vehicles, generally for transport-cars of any kind whatever motor power may be used. For the construction of these new wheels I have to some extent utilized the principle of horse-shoes. This structure is applied to a wheel in the most simple and most solid mechanical form. For road vehicles there are already known other wheels yet these are very different from the wheel of the present invention and serve for quite other purposes.

Hitherto, wheels have been constructed with open sides, while in the wheels according to the present invention the sides are closed. Hitherto the rims have been made solid and spread soil aside for the purpose of self-cleaning. By the present invention these rims are closed at both sides and fulfil the purpose of keeping strong the inlying soil and of pressing it together, so that it forms a resistance, increasing the resistance of the soil, so that a sliding of the wheels is avoided, for it would not be possible to fill the rims with strong pressed earth, this escaping through the inner openings. Furthermore, the weight of road vehicles is too great for employment on loose or sandy soil. For this purpose light motors of high power and great speed are required. Following these principles I have constructed a new wheel suitable for the described purposes. This new wheel is essentially distinguished from the well known tension-wheels by the construction of its running surfaces, hereinafter described and claimed, and illustrated in the accompanying drawings, in which Figure 1 is a side elevational view of the wheel with a half of the same shown in section. Fig. 2 is an edge elevation in partial section on the line A A of Fig. 1. Fig. 3 is another edge elevation of my improved wheel in partial section on the line B B of Fig. 1. Fig. 4 is a perspective view. Fig. 5 is an edge view in partial section, showing a modification in the construction. Fig. 6 is a sectional perspective detail view.

Similar characters of reference designate corresponding parts throughout all the different figures.

In the main form of my invention, illustrated in Figs. 1, 2, 3, 4 and 6, it will be seen that the wheel comprises circular rims or rings $b\ b$ connected together by the transverse teeth $c$, and within these rings is an inner spoke-like structure $e$ of triangular cross-section provided with lateral ribs $d$ arranged in a radial series on both sides of the spoke-like structure $e$ and extending from the hub to the rims $b$. The series of outer transverse teeth are as numerous as may be desired, and said teeth effectively join together the two rings $b$. Said teeth have in the first form of the invention, which is shown in Figs. 1, 2, 3, 4 and 6, a rhombic form. They may be more or less acute angled, or rounded off, so as to dig easily into the ground. The rings $b$ are preferably formed concavely at their outer edges, as clearly shown in the drawings. With such an arrangement of rings $b$ and teeth $c$, it will be found that the wheels dig more or less into the ground, but the deeper they penetrate the stronger the resistance will become, by reason of the entrance of the soil into the slots or openings between the narrow inner angles of the faces of the rhombic teeth $c$ and the two side rings $b$.

The inner spoke-like structure $e$ extends, as already stated, from the central hub $f$ to the peripheral teeth c, as shown very clearly in Figs. 2, 3 and 6, and may be integral with said teeth if desired. Also, on each side of the spoke-like structure e is a radial series of wings or ribs d preferably integral with the spoke-like structure e, and also with the outer rings b, and these ribs or wings d serve to strengthen the general structure, and especially to give the rings b an effective resisting power by holding them rigidly in the combination.

The concaved or bevel-shaped rings b cause the soil to offer greater resistance, and also prevent the wheels from plunging too deeply into the soil. The effect of the new construction exemplified in my improved wheel will be that the soil, and also the sandy land or deserts, will be seized strongly by the more or less broad and large rims of the wheel and compressed in some pyramidal form, creating thus a strong foothold for the wheels and permitting a great efficiency to the motor power, such as cannot be obtained with wheels of a different construction.

In the modified form of the construction delineated in Fig. 5, the rings b are formed integral with an intermediate section consisting of a circular piece which is a substitute for the teeth c and is provided with tapered passages h being preferably arranged in pairs, the effect thereof being substantially the same in the operation of the wheel as that resulting from the use of the series of teeth c.

As the motor-cars are improved so as to reach some hundred horsepower, in spite of a minimum dead or proper weight, of course it is a matter of fact that such new motor wheels will prove highly useful for the traction of plows and any other vehicles.

Having thus described my invention, what I claim as new and desire to secure by Letters Patent, is:

1. In a traction wheel of the class described, the combination of the circular rings, a plurality of angular teeth connecting said rings, a spoke-like structure of angular cross-section within said rings and carrying the hub, and a plurality of radial strengthening ribs at the sides of the spoke-like structure.

2. In a traction wheel of the class described, the combination of a pair of circular rings formed concavely at their outer edges, a spoke-like structure of angular cross-section within said rings and carrying the hub, and a plurality of angular teeth connecting the rings, said teeth being separated from each other and adapted to penetrate into the ground to create a strong foothold for the wheel.

3. In a traction wheel of the class described, the combination of a pair of circular rings formed concavely at their outer edges, an inner structure of angular cross-section intermediate between the rings and carrying the hub, a series of angular cross-members connecting said circular rings and connected to the said inner structure, said teeth being separated from each other and adapted to penetrate into the ground, and being rhombic in form.

4. In a traction wheel of the class described, the combination of the circular rings, means connecting them and providing openings which receive the ground between them, an inner spoke-like structure carrying the hub and connected to the rings, and a series of strengthening radial ribs on each side of said inner structure.

5. In a traction wheel of the class described, the combination of a pair of circular rings, means connecting them and providing teeth to engage the surface over which the wheel travels, an inner spoke-like structure of angular cross-section carrying the central hub and connected to the circular rings, and radial ribs at each side of said inner structure.

In testimony whereof I affix my signature, in presence of two witnesses.

CARL H. SCHMIDT.

Witnesses:
  HERMANN HOPPE,
  JEAN GULDEN.